Nov. 15, 1949     H. HARRISON     2,487,870
MOVABLE TOOTH FILM SPROCKET

Filed Feb. 7, 1948     3 Sheets-Sheet 1

HENRY HARRISON
INVENTOR

BY
ATTORNEYS

Nov. 15, 1949     H. HARRISON     2,487,870
MOVABLE TOOTH FILM SPROCKET

Filed Feb. 7, 1948     3 Sheets-Sheet 2

HENRY HARRISON
INVENTOR

BY
ATTORNEYS

FIG. 6.
FIG. 7.
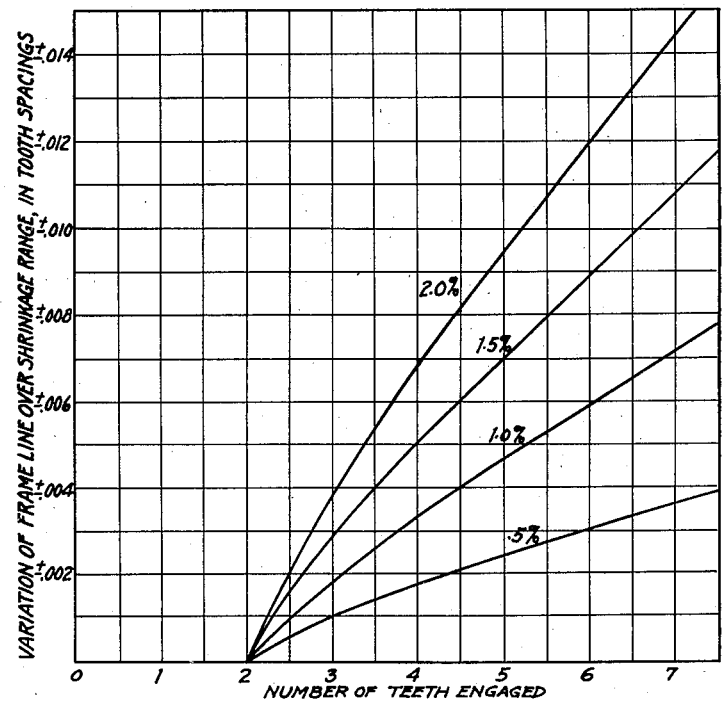
FIG. 8.
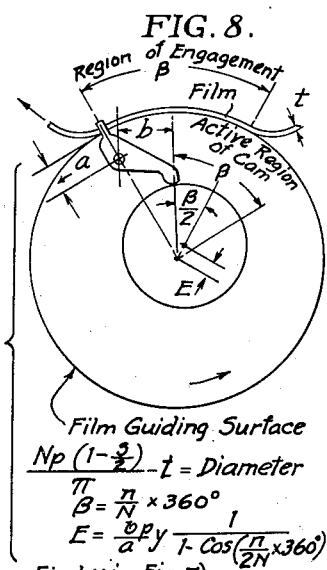
Film Guiding Surface
$$\frac{Np(1-\frac{3}{2})}{\pi} - t = Diameter$$
$$\beta = \frac{n}{N} \times 360°$$
$$E = \frac{b}{a} py \frac{1}{1 - \cos(\frac{n}{2N} \times 360°)}$$
(Find y in Fig. 7)
HENRY HARRISON
INVENTOR
BY
ATTORNEYS
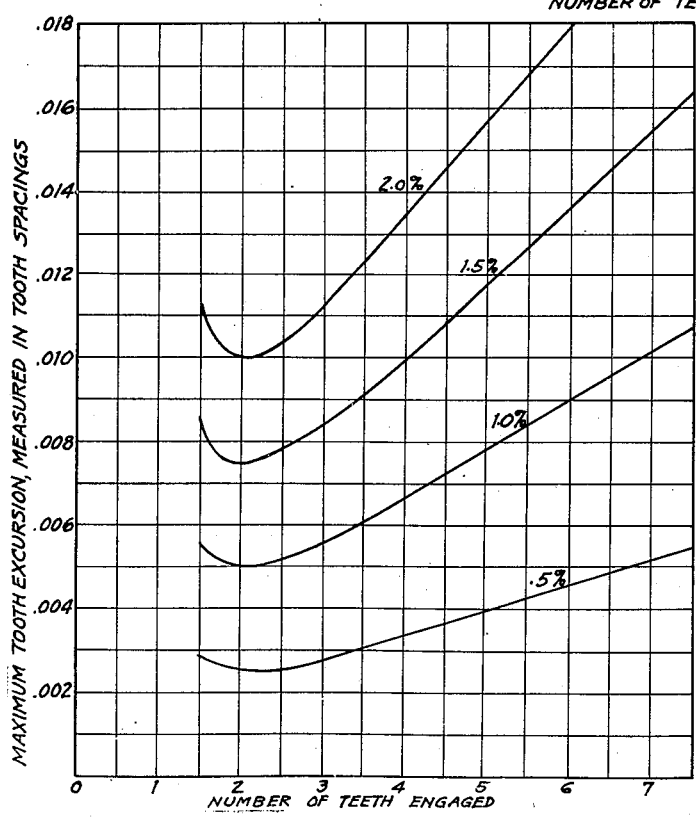

Patented Nov. 15, 1949

2,487,870

UNITED STATES PATENT OFFICE 2,487,870

MOVABLE TOOTH FILM SPROCKET

Henry Harrison, West Newton, Mass., assignor to Eastman Kodak Company, Rochester, N. Y., a corporation of New Jersey Application February 7, 1948, Serial No. 6,958

6 Claims. (Cl. 74—243)

This invention relates to photography and more particularly to an automatically compensating sprocket for motion-picture film which will permit shrunken film to pass through a film machine without tearing or damaging the perforations. One object of my invention is to provide a film sprocket which will take care of a known range of shrinkage without damage to the film. Another object of my invention is to provide a film sprocket with sprocket teeth, the spacing of which is automatically altered as the sprocket turns through a given angle. Another object of my invention is to provide a sprocket having movably mounted teeth in which the teeth will successively move back and forth circumferentially of the sprocket as the sprocket rotates. Another object of my invention is to provide a sprocket with movable teeth so arranged that the teeth, upon entering and leaving the film, will avoid contact with the edges of the perforations which extend longitudinally of the film. Other objects will appear from the following specification, the novel features being particularly pointed out in the claims at the end thereof.

As is well known, film base of all sorts is subject to shrinkage which results from temperature and humidity cycles and loss of solvents. Although this shrinkage can be partially controlled, it may, even in modern films, range as high as 1.5%. Of course, different films shrink differently. In nitrate film, the shrinkage is usually less than ½%. Safety cellulosic film of mixed esters and slightly hydrolyzed cellulose acetate may shrink from ½% to 1½%. These figures are approximate and are for normal use. Very old film, which has been kept under adverse conditions, may shrink more. This range of shrinkage makes it difficult to drive film steadily and at the same time index it by means of the perforation holes. Sprockets with fixed pitch can fit only one shrinkage, or size, of film precisely and at all other shrinkages they introduce unsteadiness into the film motion. On the other hand, steady film motion is essential to continuous printers, sound systems, and many other types of equipment. Ordinarily, sensitized film which has not been exposed and which has not been processed and dried is not subject to anything like the same degree of shrinkage that occurs after the film is exposed and processed and, consequently, the difficulties of shrinkage usually occur and are most serious when processed film is to be printed. Shrinkage is not usually considered a factor in camera design. Thus, while my improved sprocket is primarily designed for film machines, such as continuous printers or other machines over which processed and shrunken film may pass, such sprockets can also be used to advantage with machines for handling any film having only very slight or nominal shrinkage.

My improved sprocket is provided with independently movable teeth. They deviate by a cam-controlled amount from the steady motion of the sprocket hub. Their deviation is controlled in such a way that the spaces between the teeth become progressively smaller in the direction of drive throughout the region of engagement of the film. By this means, it is possible for the sprocket to fit all normal film shrinkages at once without adjustment. In other words, the perforation hole spacing on any normal shrinkage of film will always correspond to the space between teeth in some part of the region of engagement of the film with the sprocket.

It is evident that the sprocket teeth in regions of engagement which do not match the film shrinkage will draw away from the film as long as the thickness of a tooth is small enough so that the back face does not touch the perforation. Thus, where the sprocket enters and leaves engagement with the film, the teeth are always free.

The film motion produced by this kind of a sprocket is not perfectly uniform. All the teeth are moving at different speeds so that where there must be a discontinuity of speed when the film load transfers from one tooth to the next, the best that can be done is to make this discontinuity in speed the same for all shrinkages of film. It can be kept to a very low value adequate for sound reproduction, even at maximum shrinkage range, if the shrinkage is spread over a reasonable number of teeth—say five—engaged with the film.

A parabolic law of deviation is required to make the effect exactly the same for the whole normal shrinkage range, but the high region of a circular eccentric cam is a very good approximation to a parabola, and it has been found that the difference between such an eccentric cam and a parabola is so slight that I have used the former because it is so much simpler to generate.

I am aware that others have attempted to compensate for film shrinkage and have improved steadiness of shrunken film passing over sprockets. In U. S. Patent No. 2,347,786, McNabb, granted May 2, 1944, flexible teeth are used, these teeth flexing through pressure on the film apertures. So far as I know, it is new to provide teeth successively movable relative to a constantly driven sprocket and through a region of engagement with a film to provide the necessary tooth-aperture clearance and to move shrunken film with a minimum unsteadiness.

Coming now to the drawings wherein like reference characters denote like parts throughout:

Fig. 6 shows a graph showing the variation of frame line over shrinkage range in tooth spacings plotted against the number of teeth engaged in the film;

Fig. 7 is a graph showing the maximum tooth excursion measured in tooth spacings plotted against the number of teeth engaged;

Fig. 8 is a diagrammatic showing of a pivoted tooth type of sprocket, this serving as a guide for the sprocket and cam design.

Figure 3:
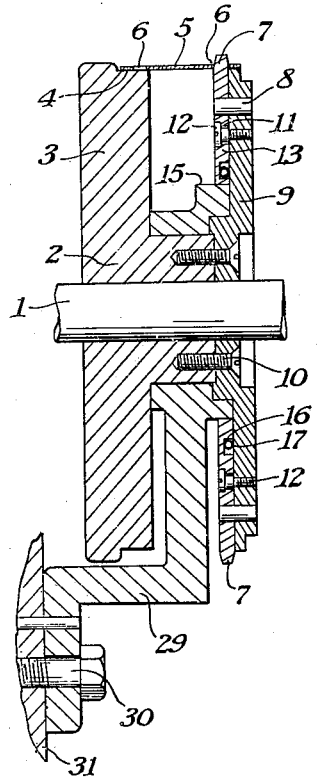
Fig. 3 is a cross section through a typical sprocket and including the sprocket tooth form of Fig. 2.

As above explained, my invention consists in independently mounting sprocket teeth for moving and driving these teeth through a predetermined excursion by a cam. Referring to Fig. 3, one form of my sprocket may consist of a shaft 1 on which a hub member 2 is carried; this hub member including a flange 3 having an annular supporting surface 4 for a film 5. This film may be perforated at 6 and in this embodiment the perforations 6 on one side of the film engage sprocket teeth 7. These teeth may be formed on both sides of the sprocket, but this usually adds to the difficulties in precise mounting of the teeth and double-toothed sprockets are not usually required. The teeth 7 are pivotally mounted at 8 to a flange 9 which may be attached, as by means of screws 10, to the hub 2. Shaft 1 may be driven by machine mechanism (not shown) and at the required constant speed.

Figure 2:
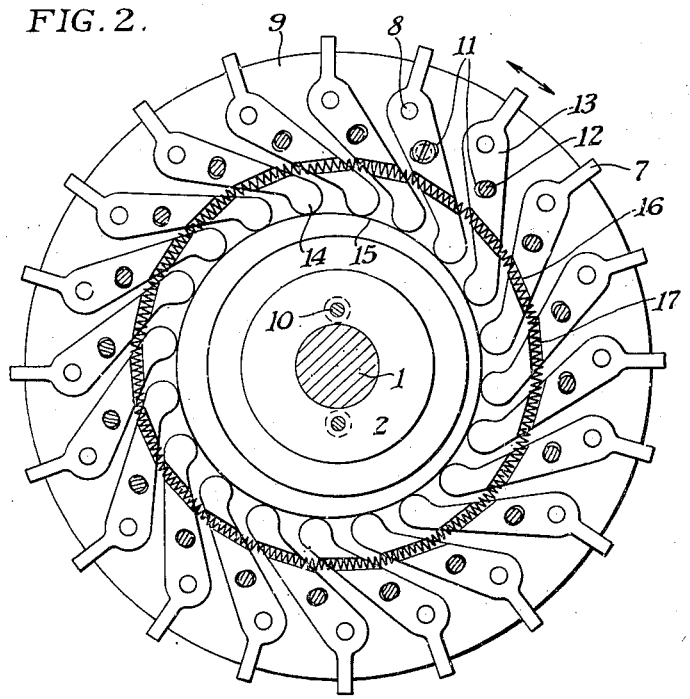
Fig. 2 is a second embodiment of my invention in which each sprocket tooth may be independently carried.

Each tooth 7 is arcuately slotted as shown in Fig. 2 at 11 so that a shouldered screw 12 may limit the movement of the tooth about its pivot 8 to a maximum amount. Each tooth 7 is formed on the end of an arm 13 and terminates in a contacting knob 14 which constitutes a cam follower and which may rest on the surface 15 of a cam which may be either parabolic or a circular eccentric. Each tooth arm 13 carries a groove 16 extending diagonally through the arm so that it may be engaged by a garter spring 17; one spring encircling the hub 2 and through engagement with each tooth arm 13 holding the contacting ends 14 of the tooth arms in contact with the surface of the cam. In the form of my invention shown in Fig. 2, the teeth are constantly moving in a circumferential direction, as shown by the arrow, back and forth as the sprocket rotates. This back-and-forth movement, or tooth excursion, is extremely slight, as will be pointed out hereinafter.

Figure 1:
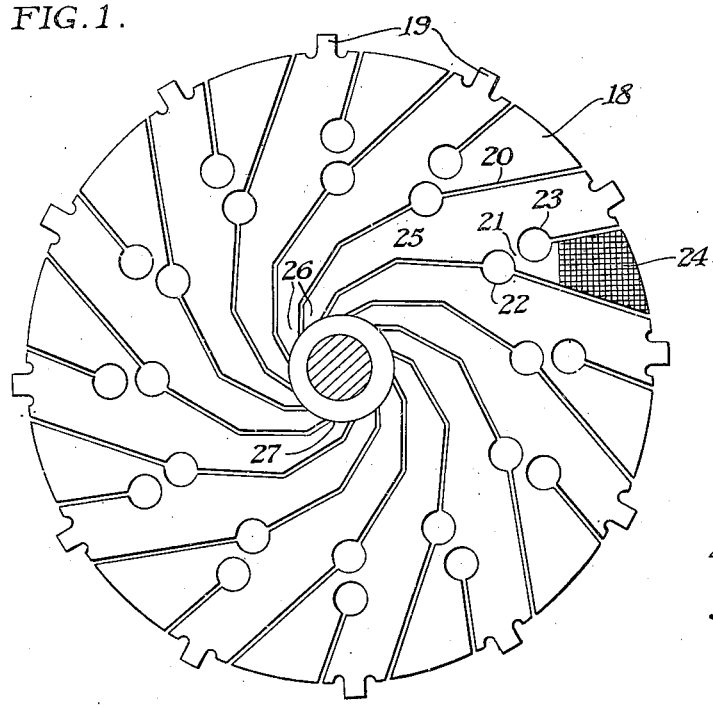
Fig. 1 is a side elevation of a single plate carrying a plurality of sprocket teeth constructed with a preferred embodiment of my invention.

In another form of my invention, as indicated in Fig. 1, an integral plate 18 may carry all of the sprocket teeth 19 and these teeth may be made resilient by a series of saw cuts 20 which almost sever each tooth from the plate. However, these saw cuts are arranged, as shown, with narrow, flexible necks 21 extending between the pairs of apertures 22 and 23, so that by spot-welding or sweating the areas 24 to a sprocket flange, such as sprocket flange 9 of Fig. 3, the tooth arms 25 may flex about the narrow necks 21 as the contact arms 26 contact with a suitable cam 27.

There is quite an advantage in forming a sprocket as shown in Fig. 1, because the teeth can be all milled on the single disk, the apertures 22 and 23 may be drilled, the saw cuts 20 may be made and the plate may be attached to its supporting flange so that the spacing between the teeth can be accurately maintained during the manufacture of the sprocket. The tooth movement or excursion is so slight that the flexibility of the narrow neck 21 is quite sufficient to permit each tooth to move the required distance. However, the form of the invention shown in Fig. 2 is somewhat more common practise in its general construction and may be a preferred form of the invention.

In both forms of my invention as illustrated in Figs. 1 and 2, parts, such as cams 15 and 27, are purposely exaggerated because, otherwise, since the movement of the teeth is so slight, the cams would be hardly noticeable. This very slight movement is one reason why the "flexible-reed" type of movably mounted sprocket teeth of Fig. 1 is satisfactory. I have also purposely illustrated the sprocket as including somewhat fewer teeth than I normally prefer to have, to simplify the illustration.

It will be noticed that each tooth can turn upon its pivot 8 as the cam 15 is engaged by the cam follower 14 of the tooth arm 13 and, since the cam 15 in the form of the invention illustrated, is carried by a bracket 29, which may be attached as by a bolt 30 to a support 31, the cam surface 15 remains stationary while the sprocket is driven by the shaft 1. Thus, the teeth move forward and back with respect to steady motion of the sprocket drum. Each tooth is positively moved since the cam followers 14 are always held in contact with the cam by the garter spring 17.

For the best results, a designer should design a sprocket for the particular job which he has in hand. In creating a new sprocket, the designer will be faced with certain limitations arising from the nature of his problem. He will have given the diameter of the sprocket and the number of the teeth. He will also have given the shrinkage range of film to be accommodated and the tolerable unsteadiness in the motion. He will also be able to state the maximum and minimum tolerable wrap consistent with the rest of his machine. From these premises he will wish to find the number of teeth in engagement, the pitch diameter of the sprocket, the width of the sprocket teeth, and the eccentricities of the cam. All these can be readily obtained from the charts, Fig. 4 to Fig. 8 inclusive.

Figure 4:
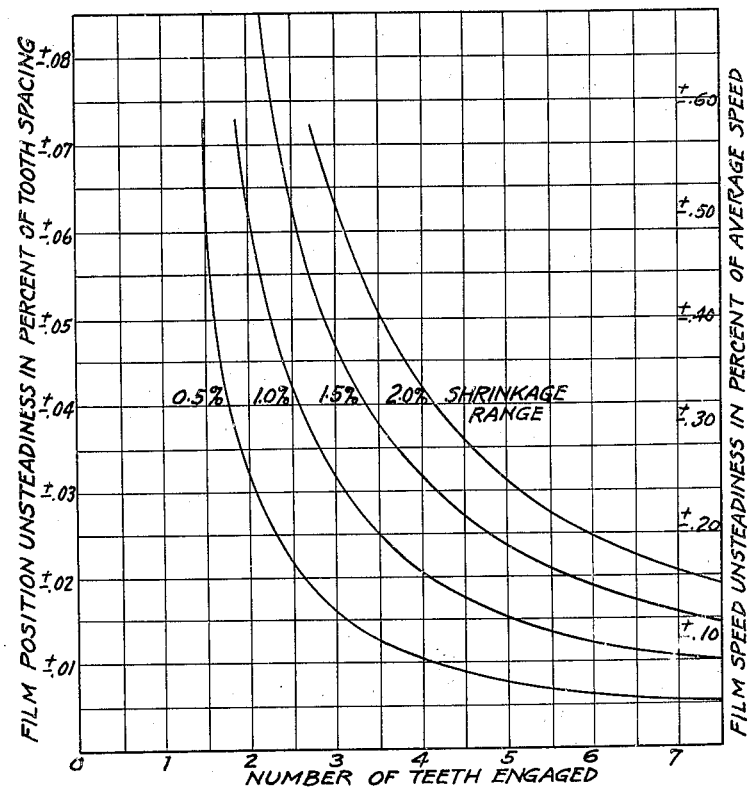
Fig. 4 is a graph showing the film position unsteadiness in percentage of tooth spacing and showing the film speed unsteadiness in percentage of average speed.
Figure 5:
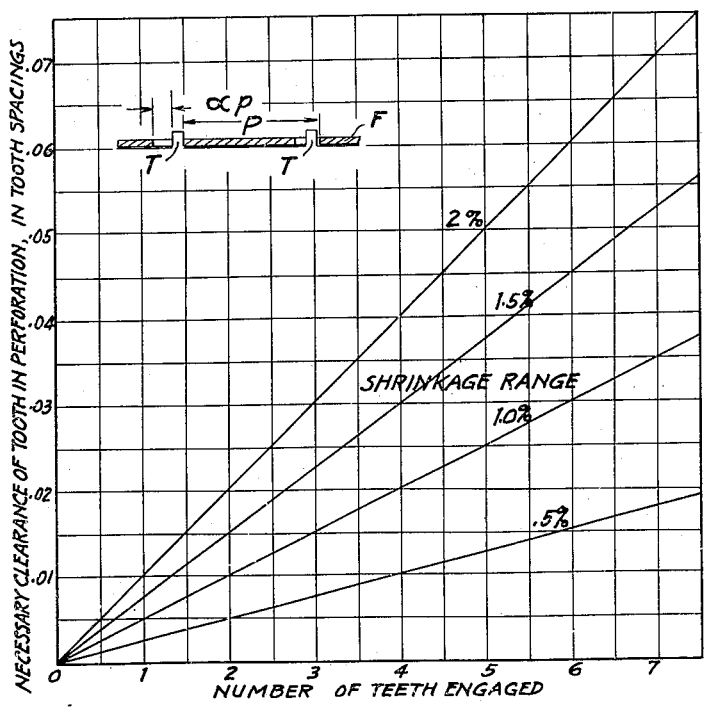
Fig. 5 is a similar graph showing the necessary clearance of the teeth in the perforations with relation to tooth spacings. This also includes the number of teeth engaged.

Fig. 4 shows how the unsteadiness of the film motion depends on the number of teeth engaged and the shrinkage range to be accommodated. If the ultimate in steadiness is desired many teeth should be engaged with the film. Fig. 5 shows the relation between maximum tooth width, the number of teeth engaged, and the shrinkage range. In the upper corner of this figure it is shown that if the backs of the teeth are to clear the perforation holes, the number of teeth engaged is limited in this way.

Fig. 6 shows the displacement of the frame line of the film resulting from changing the shrinkage of the film. This is another limitation on the number of the teeth engaged.

From Fig. 5 one finds the maximum excursion of a tooth in its region of engagement given as a function of the number of teeth engaged and the shrinkage range to be accommodated. Using this figure and the schematic layout of Fig. 8, the required eccentricity of the cam can be calculated. The diameter of the film-guiding surface of the sprocket is also shown in Fig. 8.

An example to show the use of these curves in calculating a sprocket design follows; a 35-mm. printer sprocket to accommodate 1.5% shrinkage is to be constructed with teeth entering alternate perforation holes. The circumference of this sprocket will be about 19" and there will be 50 teeth. 90 lines per millimeter must be reproduced, limiting the unsteadiness contributed by the sprocket to $1/1800$ of the teeth spacing, or 0.055%. It is immediately seen from Fig. 4 that more than 3 teeth must be simultaneously engaged.

But, optical problems and space problems require that at least 6 teeth be simultaneously engaged with the film. From Fig. 5 it is found that the tooth thickness must be less than $.078 - .045 \times .375 = 0.61''$. Since printing is to take place in the center of the region of engagement, it is evident from Fig. 6 that the frame line will have a maximum displacement between films of different shrinkages of $\pm .009 \times .375 = \pm .0034''$. Fig. 7 now shows that the maximum excursion of a tooth is $.0135 \times .375 = .00506''$. In Fig. 8, $a$ is chosen arbitrarily as $\frac{1}{2}''$, $b$ is chosen as $\frac{7}{8}''$ (large in comparison to $a$ to reduce wear effects), so that the cam eccentricity becomes $$\frac{\frac{7}{8}}{\frac{1}{2}} \times \frac{.00506}{1 - \cos\left(\frac{6}{100} \times 360\right)} = .126''$$

The film-guiding surface has a diameter of $$\frac{50 \times .375 \times \left(1 - \frac{.015}{2}\right)}{\pi} - .006 = 5.918''$$

Figure 4 is based on the proposition that, in the region of engagement, the difference in speed of two succesive teeth is a constant. This is possible only if the displacement of a particular tooth is given by a time relation of the form $X = A + Bt + Ct^2$; or, when $t = kT$, $$X = A + BkT + Ck^2 T^2$$

$$X_k - X_{k-1} = BT + CT^2(k^2 - k^2 + 2k - 1)$$

$$= BT + CT^2(2k - 1)$$

If $p$ = normal pitch, $s$ = relative shrinkage range, and $n$ = number of teeth engaged, $$X_1 - X_0 = BT + CT^2 = p$$

$$\underline{X_n - X_{n-1} = BT + CT^2(2n-1) = p(1-s)}$$

$$CT^2(2n - 2) = -ps$$

$$CT^2 = -\frac{ps}{2(n-1)}$$

$$BT = p - CT^2 = p\left(1 + \frac{s}{2(n-1)}\right)$$

Taking $A = 0$.

$$X_k = p\left(1 + \frac{s}{2(n-1)}\right)k - \frac{ps}{2(n-1)}k^2 \quad (1)$$

$$X_n = p\left(1 + \frac{s}{2(n-1)}\right)n - \frac{ps}{2(n-1)}n^2$$

$$= pn + psn(1-n)\frac{1}{2(n-1)}$$

$$= pn - \frac{psn}{2}$$

$$= pn\left(1 - \frac{s}{2}\right) \quad (2)$$

For a given-shrinkage film, the driving region is always in a range of one tooth-spacing, so the unsteadiness of film drive is half the deviation from the cord from $X_{k-1}$ to $X_k$. Since this is a constant independent of $k$, $$\pm \frac{1}{2}\left(\frac{X_k - X_{k-1}}{2} - \frac{X_{k+k-1}}{2}\right) = \pm \frac{1}{2}\left(\frac{X_1 - X_0}{2} - X_{\frac{1}{2}}\right)$$

$$= \pm \frac{1}{2}\left(\frac{p}{2}\left(1 + \frac{s}{2(n-1)}\right) - \frac{ps}{4(n-1)}\right.$$

$$\left. - \frac{p}{2}\left(1 + \frac{s}{2(n-1)}\right) + \frac{ps}{8(n-1)}\right) = \pm \frac{ps}{16(n-1)}$$

Relative per cent unsteadiness is $$\pm 100 \frac{ps}{16(n-1)} / p = \pm 100 \frac{s}{16(n-1)}$$

and this is plotted in Figure 4.

Relative velocity unsteadiness is $\pm$ half the difference of velocity of two adjacent teeth divided by the average velocity between them.

$$\pm \frac{1}{2} \frac{X'_k - X'_{k-1}}{\frac{X'_k + X'_{k-1}}{2}} = \frac{\pm \frac{1}{2}\frac{ps}{(n-1)}}{p\left(1 + \frac{s}{2(n-1)}\right) - \frac{ps}{(n-1)}(2k^2 - 2k + 1)}$$

But for any reasonable range of shrinkage, $$\frac{s}{2(n-1)}(2k - 1)^2$$

is much less than 1. To a good approximation, therefore, the per-cent relative-velocity variation is $$\pm 100 \frac{s}{2(n-1)}$$

and this, being just 8 times the relative position unsteadiness, is also shown in Figure 4.

Calling $X'_k$ the distance from the first tooth face to the $k$th perforation hole in unshrunk film and $X''_k$ the same quantity for maximum-shrinkage film, and remembering that unshrunk film fits the entering teeth while shrunk film fits the leaving teeth, $$X'_k = kp$$

$$X_k'' = D + kp(1-s)$$

$$X_n'' - X_n = 0 = D + np(1-s) - np\left(1 - \frac{s}{2}\right)$$

$$D = +\frac{nps}{2}$$

$$X_k'' = \frac{nps}{2} + kp(1-s)$$

The entering tooth, then, must fit the perforation hole with at least $$\frac{nps}{2}$$

left over, to prevent the back of the tooth from touching the film. This quantity divided by $p$ is plotted in Figure 5.

For average shrinkage, the tooth at $$\frac{n}{2}$$

drives the film, but for maximum and minimum shrinkage this tooth is away from the perforation edge. Plus or minus half this deviation is the deviation of the frame line from its mean relation to the sprocket holes if the printing or scanning slit is near the center of the region of engagement.

$$\pm\frac{1}{2}\left(X_{\frac{n}{2}} - \frac{X'n}{2}\right) = \pm\frac{1}{2}\left(p\left(1+\frac{s}{2(n-1)}\right)\frac{n}{2} - \frac{ps}{2(n-1)}\frac{n^2}{4} - \frac{pn}{2}\right)$$

$$= \pm\frac{1}{2}\left(\frac{pn}{2} + \frac{psn}{4(n-1)} - \frac{psn^2}{8(n-1)} - \frac{pn}{2}\right)$$

$$= \pm\frac{1}{2}\left(\frac{psn}{4}\left(\frac{1}{n-1} - \frac{n}{2(n-1)}\right)\right)$$

$$= \pm\frac{1}{2}\frac{psn}{4}\frac{n-2}{n-1}$$

It is this quantity divided by $p$ which is plotted in Figure 6, showing the relative displacement of the frame line from its mean position, as a function of the number of teeth engaged, for various shrinkage ranges.

Figure 8 shows the proper sprocket diameter to be $$\frac{Np}{\pi}\left(1-\frac{s}{2}\right) - t$$

where $N$ is the total number of teeth and $t$ the thickness of the film. This diameter of sprocket just fits a film of average shrinkage. But $$X_n = np\left(1-\frac{s}{2}\right)$$

is obviously an integral number of tooth spacings on the sprocket. This means that in the region of engagement with the film, each tooth moves forward and then returns to the same position relative to the sprocket drum. The amount of this motion is greatest at the center of the engagement region:

$$\left(X_{\frac{n}{2}} - \frac{Xn}{2}\right) = p\left(1+\frac{s}{2(n-1)}\right)\frac{n}{2} - \frac{psn^2}{2(n-1)4} - \frac{pn}{2}\left(1-\frac{s}{2}\right)$$

$$= \frac{pn}{2} + \frac{psn}{4(n-1)} - \frac{psn^2}{8(n-1)} - \frac{pn}{2} + \frac{pns}{4}$$

$$= \frac{psn}{4}\left(\frac{1}{n-1} - \frac{n}{2(n-1)} + 1\right) = \frac{psn}{4}\left(\frac{2-n+2n-2}{2(n-1)}\right)$$

$$= \frac{psn^2}{8(n-1)}$$

This quantity divided by $p$ is the relative maximum excursion of each tooth, $y$, plotted in Figure 7 against the number of teeth engaged, for various shrinkage ranges.

Figure 8 shows how to use the answer from Figure 7 to lay out the eccentric. In the angle $$\left(\frac{n}{2N} \times 360\right)^{\circ}$$

the tooth must move forward the amount $py$, which implies that the cam must rise $$\frac{b}{a}py$$

reaching its maximum at the center of the region of engagement with the film. To do this, the eccentricity, $E$, must be $$E = \frac{\frac{b}{a}py}{1 - \cos\left(\frac{n}{2N} \times 360\right)^{\circ}}$$

as given in Figure 8, and the line of centers must be through the point where the cam follower from the tooth in the center of the region of engagement touches the cam.

When a designer follows the above instructions, sprockets can be readily designed to suit any problem at hand. The film may be of any size, standard or otherwise, and of any perforation. Usually, both the film and perforation will be standard, as 35-mm. and 16-mm., which are the most commonly used. Of course, a film shrinkage of above 2½% is more difficult to compensate for and the design is increasingly difficult. There may be a possible amount of shrinkage (very large) which cannot be compensated for. However, this is not material from the practical standpoint as with modern motion-picture film, shrinkage usually remains well below 2½% and often does not exceed ½%. This percentage differs with different films and is normally greatest with aged and dried film. The designer should always design a sprocket which will preferably take care of only the maximum film shrinkage that the machine has to care for. Obviously, a sprocket designed for film having only ½% shrinkage should not be used if greater shrinkage is to be encountered. Also, it is desirable to hold the tooth excursions to only that necessary for the work at hand.

I claim:

1. A compensating sprocket for perforated motion-picture film including a flange, a plurality of levers pivotally mounted thereon, teeth carried by the levers adjacent the periphery of the flange, cam followers carried by the opposite ends of the lever and offset radially from the teeth, and cam means separate from the sprocket over which the cam followers may be moved when the sprocket turns to move the teeth through a predetermined path.

2. A compensating sprocket for perforated motion-picture film including a flange, a plurality of levers pivotally mounted thereon, teeth carried by the levers adjacent the periphery of the flange, cam followers carried by the opposite ends of the lever and offset radially from the teeth, cam means separate from the sprocket over which the cam followers may be moved when the sprocket turns to move the teeth through a predetermined path, and spring means acting on the cam followers to press said cam followers against the cam.

3. A compensating sprocket for perforated motion-picture film including a flange, a plurality of levers pivotally mounted thereon, teeth carried by the levers adjacent the periphery of the flange, cam followers carried by the opposite ends of the lever and offset radially from the teeth, cam means separate from the sprocket over which the cam followers may be moved when the sprocket turns to move the teeth through a predetermined path, grooves in the levers, and a garter spring lying in the grooves and tending to hold all the cam followers in contact with the cam.

4. A compensating sprocket for perforated motion-picture film including a hub, flanges having film-supporting peripheries carried by the hub, a cam surrounding the hub, means for supporting the cam separately from the sprocket, and a plurality of individually and movably mounted teeth carried by one flange, an offset arm carrying each tooth, and spring means for holding the arms in contact with the cam whereby movement of the sprocket relatively to the cam may vary the spacing of the teeth through a predetermined angle of rotation.

5. A compensating sprocket for perforated photographic film comprising a hub, a flange, a plurality of teeth integrally formed on a metal plate, slots in the plate separating the individual teeth therefrom except for a narrow resilient metal band forming a "flexible reed," means for fastening slotted severed areas of the metal plate to the flange, and cam means for flexing the narrow resilient "reeds" in a definite order and to a definite amount whereby each tooth may vary in spacing from the adjacent tooth as said sprocket is rotated.

6. A compensating sprocket for perforated motion-picture film including a hub, flanges having film-supporting peripheries carried by the hub, a cam surrounding the hub, means for supporting the cam separately from the sprocket and between the flanges about the hub, a plurality of individually and movably mounted arms, teeth on the arms, cam followers engaging the cams and means for holding the cam followers against the cam to drive the teeth through predetermined excursions.

HENRY HARRISON.

REFERENCES CITED

The following references are of record in the file of this patent:

UNITED STATES PATENTS

| Number | Name | Date |
|---|---|---|
| 500,807 | Hunt | July 4, 1893 |
| 568,837 | Cowen | Oct. 6, 1896 |
| 2,277,693 | Dybvig | Mar. 31, 1942 |